United States Patent [19]

Saur

[11] 4,223,780

[45] Sep. 23, 1980

[54] ACCUMULATION CONVEYORS

[75] Inventor: Charles W. Saur, Sparta, Mich.

[73] Assignee: Rapistan Incorporated, Grand Rapids, Mich.

[21] Appl. No.: 938,866

[22] Filed: Sep. 1, 1978

[51] Int. Cl.² ............................................. B65G 13/06
[52] U.S. Cl. .................................... 198/781; 198/460; 198/789
[58] Field of Search ............... 198/781, 783, 789, 347, 198/460, 790

[56] References Cited

U.S. PATENT DOCUMENTS

| | | | |
|---|---|---|---|
| 1,728,538 | 9/1929 | Gentile et al. | 198/781 X |
| 3,718,248 | 2/1973 | Muller | 198/781 |

FOREIGN PATENT DOCUMENTS 292567  8/1965  Netherlands ............................ 198/781

Primary Examiner—Robert B. Reeves
Assistant Examiner—Douglas D. Watts
Attorney, Agent, or Firm—Price, Heneveld, Huizenga & Cooper

[57] ABSTRACT

An accumulator is disclosed in which the articles are transported on a bed of carrier rollers. Beneath the rollers a plurality of devices, arranged in tandem lengthwise of the conveyor, provide vertical support for the propelling member. Each support has a bracket pivotally mounted between its ends with a propelling member support pulley at one end and a bracket manipulating propelling member tracking roller at the other end. The tracking roller is tapered and is mounted for rotation about a shaft extending transversely of the propelling member. The shaft is longer than the roller permitting the tracking roller a limited amount of axial travel. By changing the angular relationship between the roller and propelling member, the point of contact between the propelling member and tracking roller is shifted lengthwise of the roller, resulting in pivotal movement of the bracket which raises and lowers the propelling member to effect drive and release of the carrier rollers forming the conveyor bed. Article actuated sensors control the angular position of the tracking roller.

31 Claims, 13 Drawing Figures

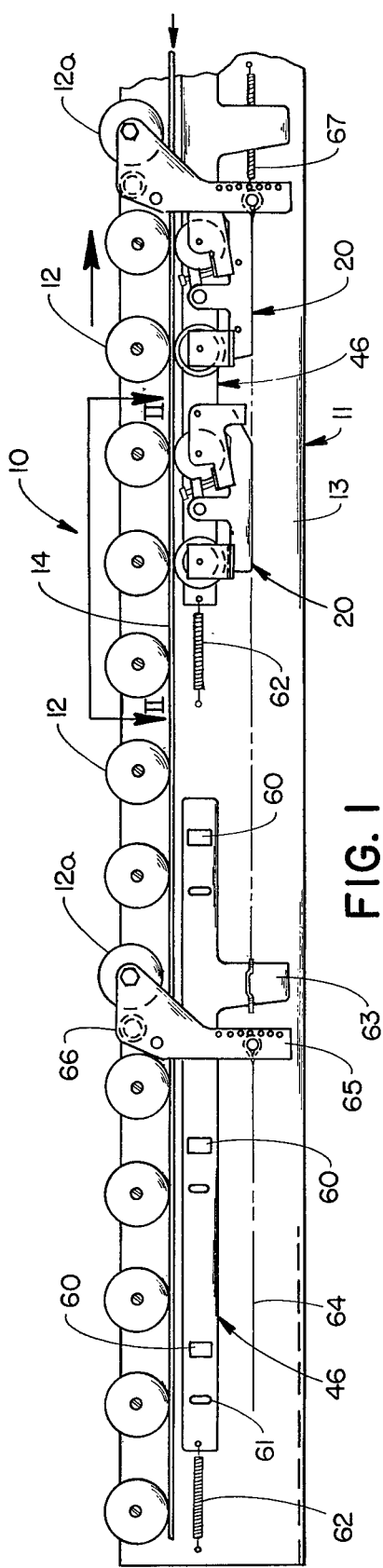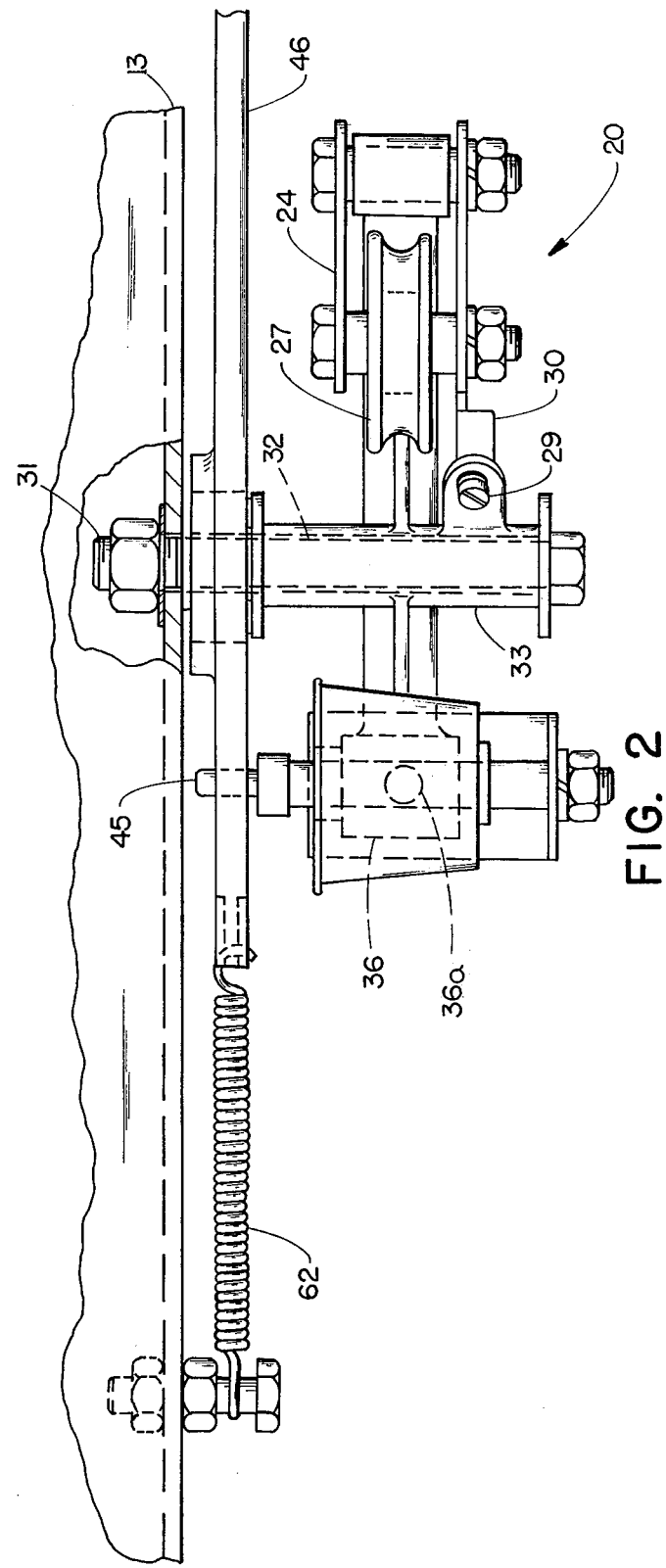

ACCUMULATION CONVEYORS

FIELD OF THE INVENTION

The invention is an improvement in powered conveyors and particularly involves that type of powered conveyors which are capable of article accumulation. The conveyor is of the type capable of automatically shifting between transport to accumulation modes without the intervention of an operator with the shift occurring as the result of sensing the presence of articles on the conveyor. The conveyor automatically continues to transport articles but if, for any reason, the forward movement of the articles is blocked, the conveyor will sense this condition and will react to it by progressively releasing or largely releasing the transport force applied to each of the following articles as they approach the immobilized article ahead.

BRIEF DESCRIPTION OF THE INVENTION

The invention involves a conveyor having a plurality of rollers providing a conveying surface. The rollers are driven by a powered propelling member, such as a cable. In the transport mode, all or a substantial number of the rollers are driven by the cable. The cable is supported from beneath by vertically movable support means which govern the position of the cable and, thus, whether it is in transport or accumulation mode. The supports involve the use of a conical roller which, when its axis is inclined in one direction with respect to the cable, travels lengthwise of its axis so as to shift the cable's position on the roller toward the roller's smaller diameter end, thus lowering the cable. When the pivotal position of the axis of the roller is reversed, the roller travels in the opposite direction, lifting the cable as its point of contact shifts to the larger diameter end of the roller. When the cable engages the large end of the roller, the cable is pressed against two carrier rollers with the result that the conveyor operates in transport mode. When the cable is shifted to the small end of the tracking roller, the cable is lowered and is disengaged from one of the carrier rollers and has only slight contact with the other of the two carrier rollers. The pressure exerted by the support on the cable is such that the frictional contact between the cable and the one roller is much too small to result in article movement or to generate any significant line pressure. The shifting of the angular attitude between the tracking roller and the cable is controlled by a sensor which itself is moved by the articles passing over it.

BRIEF DESCRIPTION OF THE DRAWINGS

FIG. 1 is a sectional elevation view of a powered roller conveyor equipped with this invention with the propelling member supports deleted on the left-hand end of the view for clarity;

FIG. 2 is an enlarged sectional view taken along the plane II—II of FIG. 1 with the carrier rollers deleted for clarity;

DESCRIPTION OF THE PREFERRED EMBODIMENT

Figure 6:
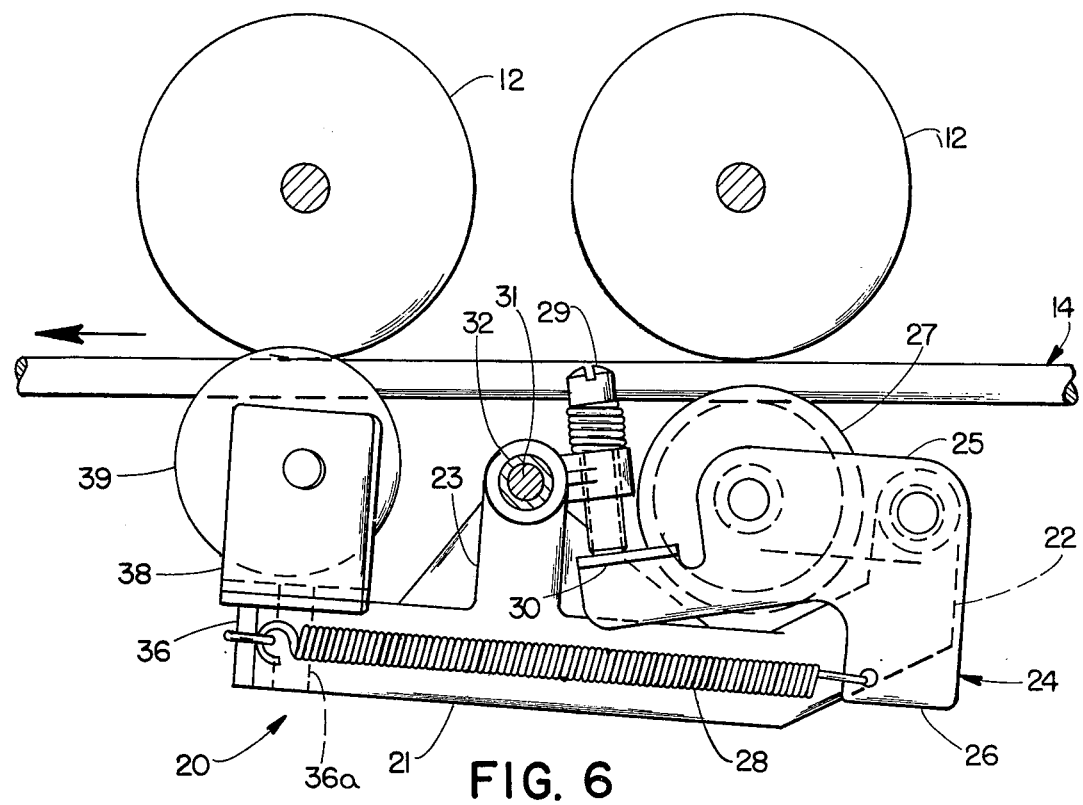
FIG. 6 is a view similar to FIG. 5 showing the propelling member support in accumulation mode.
Figure 5:
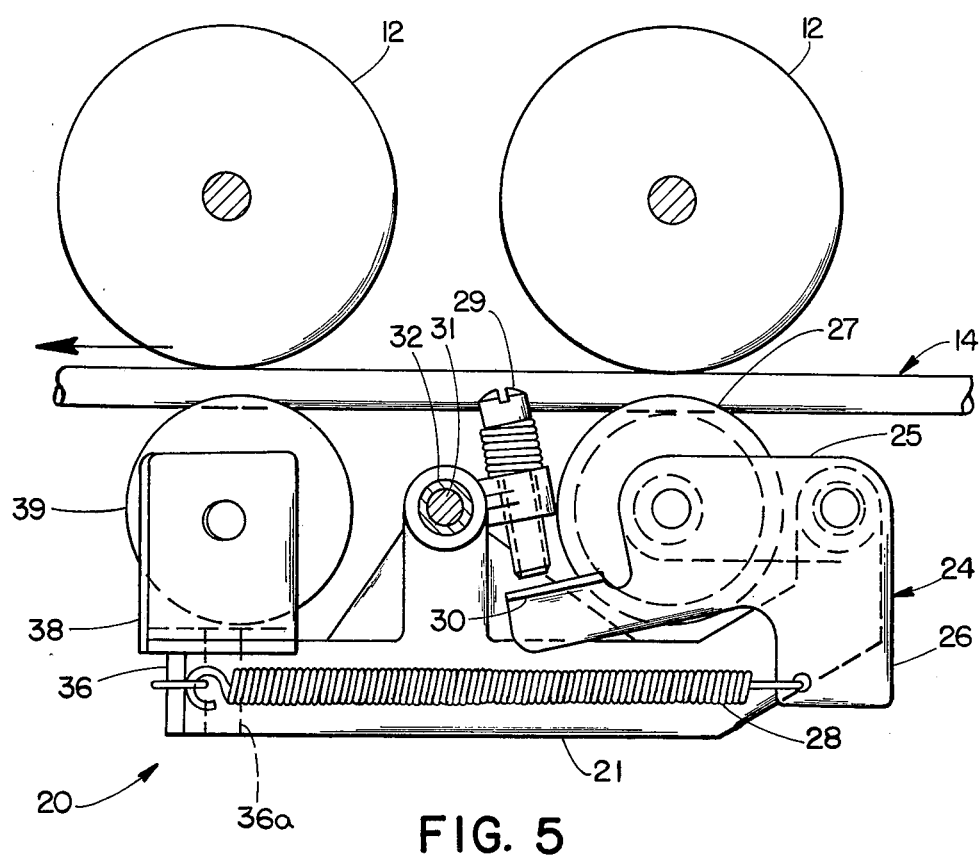
FIG. 5 is a side elevation view of the propelling member support in transport mode.

Referring specifically to the drawings, the numeral 10 refers to a conveyor having a frame 11 and a plurality of rollers 12 forming an article supporting and transporting surface. Conventionally, the frame 11 has a pair of side rails 13, only one of which is illustrated. Beneath the rollers 12 is a driven propelling member 14 supported at spaced intervals along the conveyor by support members 20 (FIGS. 1, 5 and 6). In the preferred embodiment, the propelling member is illustrated as a cable. However a round or a V-belt as well as a flat belt may be substituted for the cable. Where a cable is used, it is preferably a wire cable encased in a suitable jacket of plastic, such as nylon.

As best seen in FIGS. 5 and 6, each of the cable support members 20 has a bracket 21 with an upstanding end post 22 at one end and a support post 23 intermediate its ends. Pivotally mounted to the upper end of the end post 22 is a generally L-shaped rocker link 24 having one leg 25 extending generally lengthwise of the bracket and its other leg 26 extending downwardly. A pulley 27 is rotatably mounted to the leg 25 intermediate its ends. A spring 28 has one end attached to the lower end of the link's other leg 26 and its opposite end secured to the bracket to bias the link 24 in a manner to pivot the pulley 27 upwardly. The pivotal movement of the link under the bias of the spring is limited by an adjustment screw 29 mounted on the support post 23 and acting against the stop pad 30 on the free end of the link's leg 25.

As best seen in FIG. 2, each bracket 21 is pivotally mounted to one of the side rails 13 by means such as the bolt 31 inserted through the transverse shaft housing 33 at the upper end of the support post 23. An appropriate spacer 32 is provided so that the bolt can be tightened without binding the bracket against pivotal movement (FIGS. 5 and 6).

Figure 7:
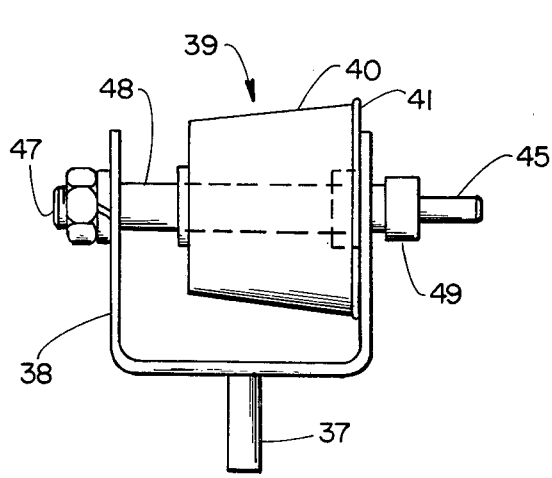
FIG. 7 is an elevation view of the tracking roller and its supporting yoke.

The end of the bracket 21 opposite from the lever 24 and pulley 27 has a boss 36 (FIG. 2) having a vertical opening 36a. The opening 36a receives the mounting pin 37 of the yoke 38. The yoke 38 rotatably mounts a cable tracking roller 39 (FIG. 7). The body of the tracking roller 39 is frusto-conical, providing a tapered surface 40. At the larger of its ends, it has a radially projecting lip 41. The preferred taper for the body of the tracking roller is 6°, but it has been found that tapers somewhat larger or smaller than this will work. A preferred material from which to mold the tracking roller or with which to coat it is nylon. The material used must have some lubricious characteristics. However, materials having a very low coefficient of friction have not been satisfactory. To some extent, the particular material will be governed by the surface characteristics of the propelling member since it is a contributing factor to the degree of friction generated between the roller and propelling member.

Figure 3:
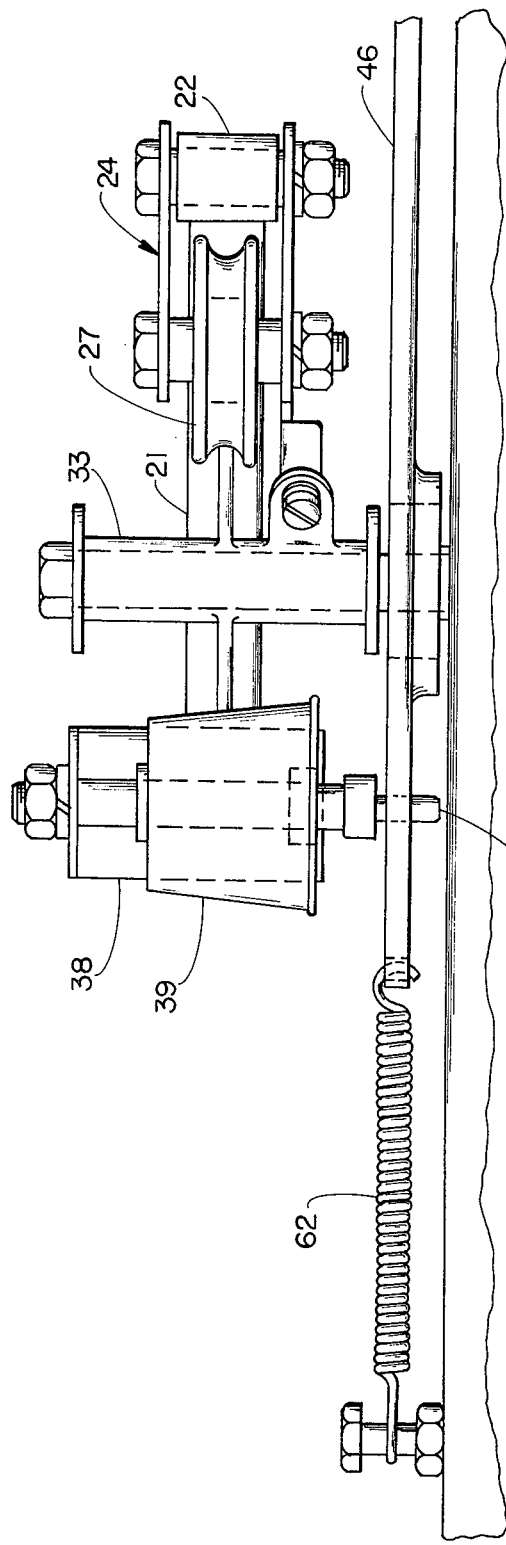
FIG. 3 is a plan view similar to FIG. 2 showing the tracking roller at one limit of its angular travel in solid lines, and at the other limit of its travel in phantom lines.
Figure 4:
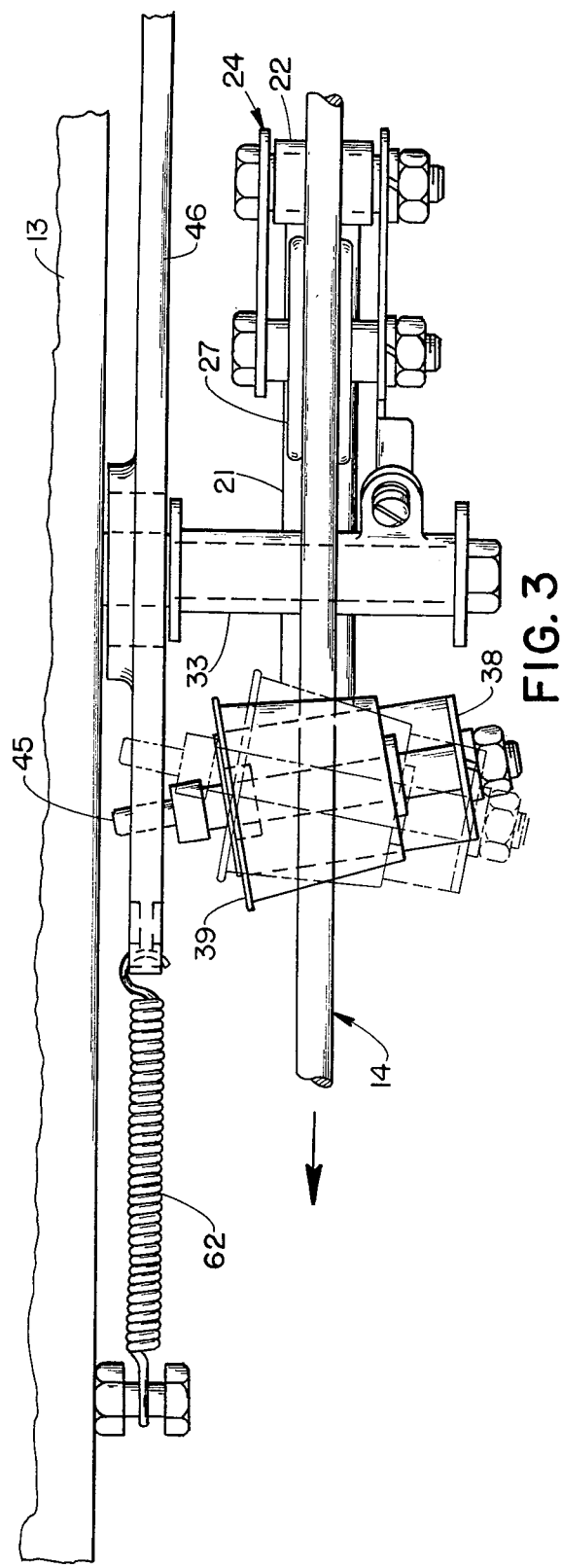
FIG. 4 illustrates the propelling member support mounted on the opposite side rail of the conveyor.

The yoke 38 is designed to pivot about the vertical axis established by the pin 37. Tests have established a preferred degree of pivotal movement to be about four and one-half degrees on each side of a position normal to the longitudinal axis of the propelling member. To control the pivotal movement of the yoke, an arm 45 projects from one side and engages an opening in the control bar 46 (FIGS. 2, 3 and 4). Preferably, the arm 45 is an extension of the shaft about which the tracking roller 39 rotates. One way of doing this is to provide a shouldered bolt 47 extending through the yoke which mounts a spacer 48 on which the tracking roller is mounted. The extension forming the arm 45 is mounted to the head 49 of the bolt 47.

As best seen in FIGS. 1 and 2, each control bar 46 extends lengthwise of the conveyor and is movably supported on the bolts 31 supporting the support members 20 it controls, which, in the embodiment illustrated, is three. Because the bolts 31 are surrounded by spacers 32, the bolts can be tightened leaving the brackets 21 free to pivot and without binding the bar 46. The bar has openings 60 for the bolts 31 and spacers 32 which are enlarged both lengthwise and vertically. Adjacent each opening 60, the bar also has a vertical slot 61. The slot 61 receives the end of the arm 45 and permits it to move vertically with respect to the bar as the bracket 21 rocks about its support bolt 31, while at the same time assuring positive horizontal movement of the arm in response to similar movement of the bar.

At one end, the bar 46 is connected to a spring 62. The spring 62 is secured to the frame 13 and biases the bar 46 to the left, as illustrated in FIGS. 1 and 2. Each bar 46 also has a depending leg 63 to which is mounted one end of a cable 64. The other end of the cable 64 is secured to the depending leg 65 of a hanger bracket 66 for a sensing roller 12a. One sensing roller 12a is provided for each of the bars. The hanger bracket is biased by a spring 67 acting oppositely to the spring 62. The spring 67 is stronger than the spring 62, thus, overpowering it and shifting the cable 64 and bar 46 to the right, as illustrated in FIG. 1. In this position, the sensing roller 12a is raised slightly above the plane formed by the tops of the carrier rollers 12. The pivotal movement of the hanger bracket 66 under the influence of spring 67, is limited by engagement of the bar with the spacers 32 surrounding the support bracket mounting bolts 31.

As illustrated, each of the bars 46 is operatively associated with three of the cable support members 20. This is illustrative only because each bar can be made to control a greater or lesser number of the cable support members, depending upon the length of each segment of the conveyor it is manipulating simultaneously. If relatively short articles are to be transported and accumulated, two or three of the cable support members are controlled by one bar. If long articles are involved, the number of cable support members controlled by a single bar may be increased to four or five or even more.

The operation of the invention will now be described. When the conveyor is in transport mode, the cable support members are in the position illustrated in FIG. 5. In this mode, the yoke 38 is pivoted such that the axis of the tracking roller 39 is inclined to the axis of the cable. The direction of inclination of the axis is such that the cable 14 is biased to travel toward the larger end of the roller or up the inclined surface 40 (FIG. 7). The lip 41 prevents overtravel which might cause the cable to move off the end of the roller. Under the driving force of the driven cable 14, the tracking roller will shift axially along its support 48 until the large end of the roller is beneath the cable. However, the cable 14 cannot rise because at its point of tangency with the tracking roller 39 it is directly beneath one of the rollers 12. Thus, the shift of the cable 14 up the inclined surface 40 forces the end of the bracket 21 mounting the yoke 38 to pivot downwardly. This in turn raises the opposite end, lifting the pulley 27 and pressing the cable 14 into driving engagement with the roller 12.

A limited amount of lost motion is provided for by the pivotal mounting of the link 24 as is shown by the fact that the stop 30 has been disengaged by the adjustment screw 29 (FIG. 5). In this manner, the force with which the cable is pressed against the roller 12 by the pulley 27 is governed by the spring 28. Because the bracket 21 is, in effect, floating about the pivot bolt 31, the force with which the cable 14 is pressed against the rollers 12 at both ends is substantially equal. The inclined position of the axis of the tracking roller will remain stationary because the arm 45 is held against movement lengthwise of the conveyor by its engagement in the vertical slot 61 of the control bar 46.

To shift from transport to accumulation mode, the bar 46 is shifted lengthwise of the conveyor. This is accomplished when an article on the conveyor depresses a raised sensor roller 12a, overpowering the spring 67 and permitting the spring 62 to shift the bar 46. The movement of the bar pivots the yoke 38 such that the axis of the tracking rollers moves from its transport position past a position normal to the axis of the cable to a position inclined the same amount but in the opposite direction from that at which it had been inclined. This will bias the cable to move down the inclined surface 40 causing the tracking roller to travel axially to the opposite side of the yoke (FIG 7). In so doing, the yoke end of the bracket will be free to rise. This pivotal movement of the bracket is caused by gravity, since the pulley end of the bracket is heavier than the yoke end. This can be done simply by weighting the pulley end or, as illustrated, the pulley end of the bracket is longer than the tracking roller end, setting up an unbalanced couple.

The pivotal movement results in complete disengagement between the cable and the roller 12 above the pulley 27 because upward movement of the pulley in response to the spring 28 is limited by the adjustment screw 29 (FIG. 6). Engagement between the cable and the roller 12 above the tracking roller continues. This engagement, however, provides very little propulsion force, since the upward pressure is only that which results from the unbalanced couple about the support 31. The imbalance of this couple need only be enough to assure disengagement between the cable and roller above the pulley 27.

Figure 8:
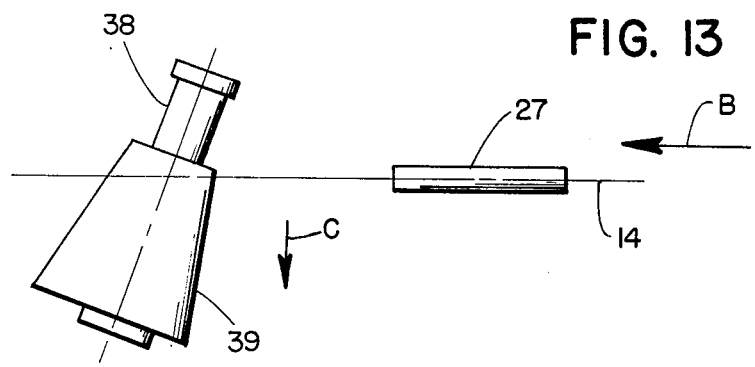
FIGS. 8 and 9 are schematic plan views of the tracking roller illustrating its principle of operation.
Figure 9:
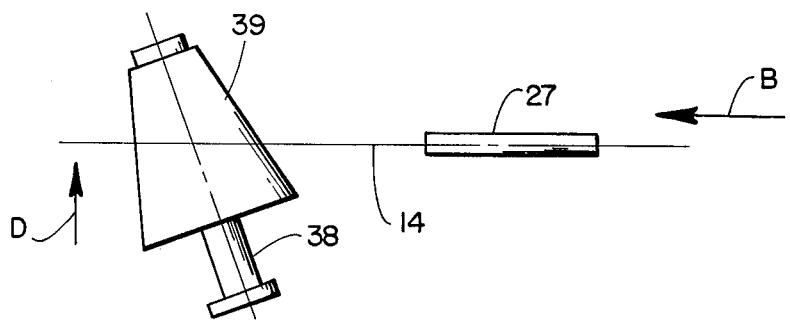
Figure 10:
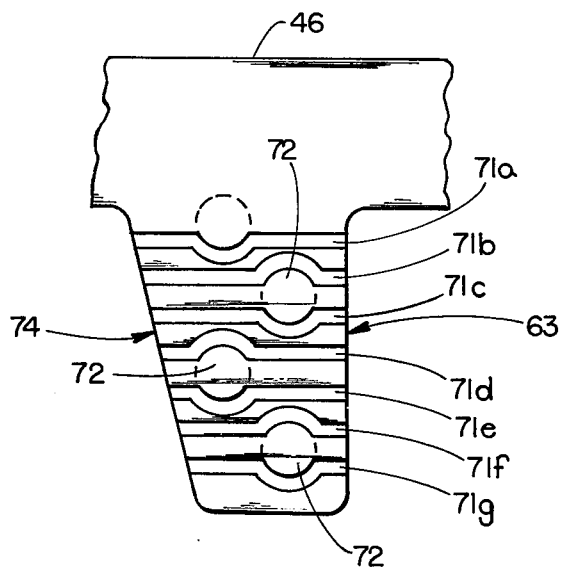
FIG. 10 is an enlarged fragmentary elevation view of the controllable anchor for the control bar mechanism.
Figure 11:
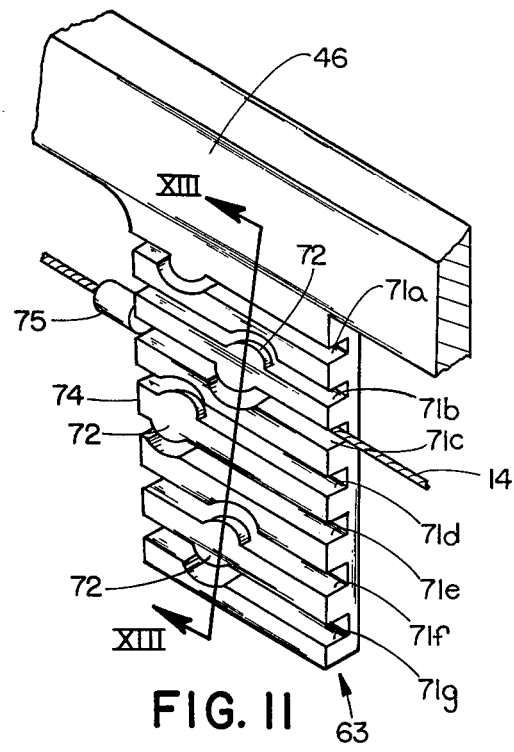
FIG. 11 is an enlarged perspective view of the control cable anchor for the control mechanism.

FIGS. 8 and 9 illustrate schematically the function of the tracking roller 39. The views are plan views, looking down on the cable and tracking roller. Arrow B in FIGS. 8 and 9 indicates the direction of the cable. Arrow C in FIG. 8 indicates the direction of axial travel or float of the tracking roller. Arrow D in FIG. 9 indicates the direction of axial travel or float of the tracking roller when the direction of inclination of the axis of the tracking roller is reversed with respect to the axis of the cable.

If the direction of travel of the cable is reversed, the reactive movement of the tracking roller will also be reversed. FIGS. 3 and 4 illustrate the significance of this. Depending upon the construction of the conveyor and other factors, it may be necessary to mount the cable support members on either the left or right side of the conveyor. This can be done by reversing the direction of the bolt 31 and turning around the tracking roller 39, end for end. If the tracking roller 39 is not turned end for end, the linkage controlling the axial movement of the bar 46 must be rearranged such that for a given reaction it is at the opposite end of its limit of travel.

Figure 13:
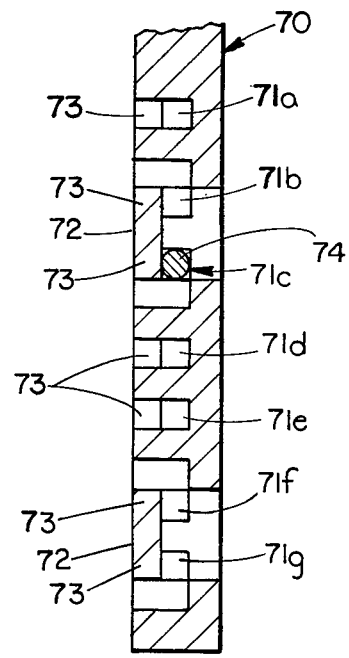
FIG. 13 is a fragmentary sectional elevation view taken along the plane XIII—XIII of FIG. 11.

The height of the sensor roller 12a can be readily adjusted by selection of the proper position for securing the sensor cable 64 to the bar 46. This structure is illustrated in FIGS. 10, 11, 12 and 13. Each bar 46 has a depending leg 63. The leg 63 has a plurality of generally horizontal cable receiving channels, indicated as 71a through g in FIG. 10. These channels open through one face of the leg. The bottom or base portion of each channel is straight in a horizontal direction but the outer portion is offset by a cap portion 72 which forms an overhanging ledge 73 (FIG. 13). By flexing the cable 14, it can be passed around cap 72, but once seated in its channel and pulled straight by the tension exerted by the springs 62 and 67, it is secured by the ledge 73 against inadvertent release from its channel.

The end 74 of the leg 63 opposite from the associated sensor roller 12a is inclined to the axis of the bar 46. Thus, with the cable 14 equipped with a stop 75 at a fixed distance from the sensing roller, by selection of the appropriate channel, the height of the sensor roller can be adjusted within a limited range. Also, adjustment can be made for differences in spacing between the leg 63 and its associated sensor roller 12a resulting from manufacturing tolerances.

Figure 12:
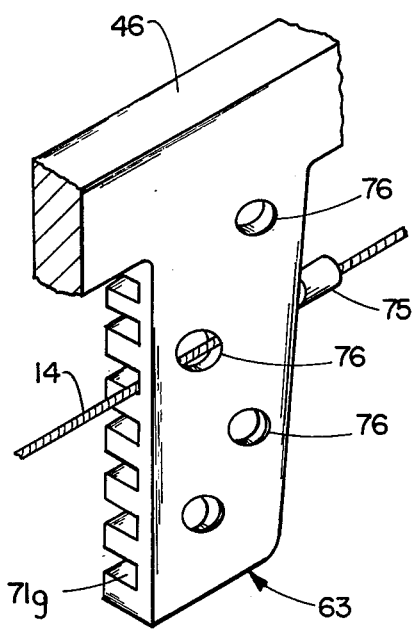
FIG. 12 is a view similar to FIG. 11 but of the opposite side of the control cable anchor.

Preferably, the bar 46 with its leg 63 is molded from plastic. To simplify the dies forming the caps 72, an opening 76 through the opposite face of the leg is provided for each cap, eliminating any overhanging structure which would require movable cams in the mold to prevent hang-up (FIG. 12).

The invention provides a number of desirable results. Since both the pulley 27 and the tracking roller 39 are in effective driving engagement with carrier rollers 12 during transport mode, a substantial driving force is applied to the conveying rollers. Thus, the construction provides an efficient conveyor. Because the pressure rollers, that is, the pulley 27 and the tracking roller 39, are each located directly beneath a carrier or transport roller 12 and the squeezing action which determines the frictional bearing pressure between the cable and the carrier rollers 12 is dependent upon the pivotal position of the bracket 21, the problems which have heretofore been experienced due to variations in tension on the cable are largely eliminated. This renders the transport ability of the conveyor basically independent of cable tension. Because the force with which the cable is pressed against the carrier rollers 12, even under maximum conditions, is applied gradually and is readily controlled to a limited value, there is no tendency for the carrier rollers to bounce as the conveyor shifts from one mode to the other. In the same manner, because the device operates relatively gradually rather than abruptly or in a jerky manner, the characteristic sudden stopping and starting of components is eliminated. The device also has the benefit of silent operation.

Since the force used to shift the vertical pivotal position of the support member 20 and thus the vertical position of the cable between its raised and lowered positions is generated from the cable itself in one mode and from gravity in the other mode, the amount of force necessary to operate the sensors or rollers 12a is materially reduced. Also, it will be recognized that very little force is required to change the angular position of the tracking roller. Thus, the differential between the springs 62 and 67 to maintain the sensor roller in raised position can be quite small. This is particularly helpful in increasing the range of weights which a single conveyor construction can handle without either the weight of the article exceeding the conveying capacity of the conveyor or being too small to actuate the sensors to effect accumulation when required.

The progressive or gradual shifting of mode accomplished by this invention results from the fact that the shift requires the tracking roller to make its transit along its axis in response to the shift in the orientation of its axis with respect to the cable. This requires a short interval to be accomplished. Further, it results in a gradual or progressive movement of the bracket 21 and, thus, the shifting modes are gradual rather than sudden. This is a significant contributing factor both to durability and to noise reduction.

While a preferred embodiment of this invention has been described, it will be recognized that various modifications of this embodiment can be made without departing from the principles of the invention. Such modifications are to be considered as included in the hereinafter appended claims, unless these claims, by their language, expressly state otherwise.

The embodiments of the invention in which an exclusive property or privilege is claimed are defined as follows:

1. An actuator for an accumulator, said accumulator having a driven, strand-like propelling member and a frame and a plurality of carrier rollers collectively forming an article supporting and transporting surface, a plurality of cable support members beneath said cable, each of said members having a bracket, said actuator characterized in that each bracket has a cable supporting pulley at one end and a cable tracking element at the other end thereof, means supporting said bracket on said frame intermediate said pulley and tracking element for rocking motion in a plane common with the centerline of said propelling member; one of said carrier rollers being vertically aligned with said pulley; the end of said bracket mounting said pulley being biased away from said carrier roller; said element having a propelling member engaging surface, said surface being inclined to an axis generally normal to the axis of the propelling member; means for causing the point of contact between said propelling member and said surface to shift along said surface whereby to rock said bracket about its support means support and shift said pulley and the portion of the propelling member supported thereon between roller driving and roller release positions.

2. An actuator for a cable driven accumulator, said accumulator having a frame and a plurality of rollers collectively forming an article supporting and transporting surface, a plurality of cable support members beneath said cable, each of said members characterized by a pulley and a cable tracking element spaced apart lengthwise of said cable; said pulley supporting said cable from beneath and being vertically aligned with one of said rollers; said cable tracking element having a cable engaging surface inclined transversely of said cable; first means supporting said pulley and second means supporting said tracking element; said first and second means being interconnected for simultaneous and opposite vertical movement and a shift element for causing the point of contact between said cable and said inclined surface to shift lengthwise of said surface for changing the vertical position of said second means, said first means in response to the vertical shift of said second means shifting said pulley and cable into contact with or away from said roller.

3. An actuator for an accumulator as described in claim 1 further characterized in that said propelling member tracking element is conical; a shaft mounting said member for both rotation and axial movement therealong whereby said tracking element can shift transversely of said propelling member.

4. An actuator for an accumulator as described in claim 3 further characterized in that said shaft for said tracking element is pivotally mounted for rotation about a substantially vertical axis whereby the axis of said tracking element can be pivoted to an angular position with respect to the axis of said cable for causing said element to shift lengthwise of said shaft in response to the angular relationship between the propelling member and the tracking element and changing the position of the point of contact with said propelling member.

5. An actuator for an accumulator as described in claim 4 further characterized in that the mounting for said tracking element is a yoke having a substantially vertical supporting pin, said pin being rotatably mounted in one end of said bracket.

6. An actuator for an accumulator as described in claim 4 further characterized in that an article actuated sensor is provided, said sensor being connected to said tracking element for pivoting said tracking element about its vertical axis to change the position of the point of contact with said propelling member.

7. An actuator for an accumulator as described in claim 6 further characterized in that said shaft has one end projecting beyond said yoke, said sensor being connected to said one end of said shaft.

8. An actuator for an accumulator as described in claim 7 further characterized in that a plurality of said actuators are provided and a bar is reciprocally mounted to said frame for connecting all of said actuators to said sensor for simultaneous actuation by said sensor.

9. An actuator for an accumulator as described in claim 3 further characterized in that a lever is pivotally mounted on the upper end of said first supporting means, said pulley being mounted on the said lever, a spring urging said lever to pivot said pulley upwardly; an adjustable stop for limiting upward travel of said lever.

10. An actuator for an accumulator as described in claim 9 further characterized in that said lever projects from said first supporting means toward said propelling member tracking element and said pulley is mounted on the end of said projection.

11. An actuator for a cable driven accumulator, said accumulator having a frame, a cable and a plurality of carrier rollers collectively forming an article supporting and transporting surface, a plurality of cable support members beneath said cable, each of said members characterized by a cable tracking element beneath said cable having a cable engaging surface inclined transversely of said cable, shaft means mounting said element for rotatable and axial movement horizontally and transversely of the axis of said cable for changing the point of tangency between said cable and said inclined surface; a yoke mounted for rotation about an axis in the same vertical plane as the cable and supporting said shaft means; a cable support member mounted for vertical movement, said support member being vertically aligned with one of said rollers; means interconnecting said support member and said yoke and element for simultaneous and opposite vertical movement whereby said support member raises and lowers said cable into and out of contact with said roller in response to the location of the point of contact of the cable with said surface.

12. An actuator for a cable driven accumulator as described in claim 11 further characterized in that said element is a spool of frusto-conical shape.

13. An actuator for a cable driven accumulator as described in claim 12 further characterized in that said spool has a radially extending lip at its larger end.

14. An actuator for a cable driven accumulator as described in claim 12 further characterized in that a control member is provided for rotating said yoke about its vertical axis to a position inclined to the axial centerline of said cable.

15. An actuator for a cable driven accumulator as described in claim 14 further characterized in that said spool has a taper of 4° to 8° and the pivotal movement of said spool about the vertical axis of said yoke is 3° to 6° on each side of a plane normal to the axis of said cable.

16. An actuator for a cable driven accumulator as described in claim 14 further characterized in that said spool has a taper of 6° and a pivotal movement of said spool about the vertical axis of said yoke is $4\frac{1}{2}°$ on each side of a plane normal to the axis of said cable.

17. An actuator for a cable driven accumulator as described in claim 16 further characterized in that said spool is of molded nylon.

18. An actuator for a cable driven accumulator as described in claim 11 wherein one of said carrier rollers is vertically aligned with each of said cable support member and said tracking element.

19. An actuator for a cable driven accumulator as described in claim 18 wherein said cable support member is a pulley; a lever pivotally mounting said pulley for vertical movement; a spring urging said lever and pulley upwardly whereby substantially equal upward pressure is exerted on said cable by both said pulley and tracking element when said cable is tangent to the large diameter end of said tracking element.

20. An actuator for a cable driven accumulator as described in claim 19 wherein a stop is provided for limiting upward pivotal movement of said pulley when the point of tangency of said cable with said tracking element approaches the small diameter end of said tracking element.

21. An actuator for a cable driven accumulator as described in claim 11 wherein a control element is mounted on said frame for movement parallel to said cable, said control element being connected to said yoke for pivoting it about its vertical axis to either side of a vertical plane normal to the central axis of said cable.

22. An actuator for a cable driven accumulator as described in claim 21 wherein an article sensor is provided, interconnecting means attached to both said sensor and said control element for moving said control element in response to article engagement of said sensor.

23. An actuator for a cable driven accumulator as described in claim 22 wherein said interconnecting means is a cable and said control element has a leg portion; said leg portion having a plurality of spaced channels opening through one face of said leg portion; each of said channels having inner and outer portions, said inner portions being straight and sections of said outer portions being offset; said channels being separated by walls; flanges projecting from said walls at said offset portions overlying said inner portions of said channels for trapping said cable in the inner portion of said channel.

24. An actuator for a cable driven accumulator as described in claim 23 wherein said cable has a stop on the end at said control element; the side of said leg remote from said sensor is inclined with respect to said cable and each of said channels is of a different length whereby the spacing between said sensor and control element can be changed with a cable of given length by selection of the channel receiving the cable.

25. An actuator for a cable driven accumulator as described in claim 24 wherein spring means are provided for applying tension to said cable.

26. A propelling member support for an accumulator conveyor of the type having a plurality of carrier rollers forming an article transporting surface and a driven propelling member beneath said carrier rollers, said support characterized in that it has propelling member supporting and tracking elements beneath said propelling member, each of said tracking elements being of tapered cross section in an axial direction, a shaft mounting each tracking element for rotation and axial travel therealong; means mounting said shaft for pivotal movement about a vertical axis to either side of a vertical plane normal to the central axis of said propeller member whereby the movement of the propelling member causes said tracking element and its point of tangency with the propelling member to shift axially and the vertical position of the propelling member to shift vertically.

27. A propelling member support for an accumulator conveyor as described in claim 26 further characterized in that stops are provided on said shaft on opposite sides of said tracking element for limiting the axial travel of said element.

28. A propelling member support for an accumulator conveyor as described in claim 26 further characterized in that said tracking element is a spool of cast nylon.

29. An accumulator conveyor, the conveyor having a plurality of carrier rollers forming an article transporting surface, a driven propelling member beneath said carrier rollers and supports for said propelling member, said supports characterized in that each has a propelling member supporting and tracking element beneath said propelling member, each tracking element being vertically aligned with at least one of said carrier rollers, each of said tracking elements being of tapered cross section in an axial direction, a shaft mounting each tracking element for rotation and axial travel therealong; means mounting said shaft for pivotal movement about a vertical axis to either side of a vertical plane normal to the central axis of said propeller member whereby the movement of the propelling member causes said tracking element and its point of tangency with the propelling member to shift axially and the vertical position of the propelling member to shift vertically.

30. An accumulator conveyor as described in claim 29 further characterized in that an article actuated control means connected to said tracking elements is provided; said control means being movable for pivotally moving said shaft about the vertical axis.

31. An accumulator conveyor as described in claim 30 further characterized in that said tracking elements are arranged in groups lengthwise of said conveyor; a control means for each group, each control means being connected to all of the tracking elements in its associated group and being independent of the control means of other groups.

* * * * *